United States Patent Office 3,265,471
Patented August 9, 1966

3,265,471
PROCESS FOR ION EXCHANGE IN BASIC MEDIUM FOR THE RECOVERY OF URANIUM FROM LOW-STRENGTH SOLUTIONS
Paul Pottier, Chatillon-sous-Bagneux, France, and Edmondo Macchiaverna, Buenos Aires, Argentina, assignors to Commissariat a l'Energie Atomique, Paris, France, and Comision Nacional Atomica, Buenos Aires, Argentina
No Drawing. Filed Jan. 28, 1964, Ser. No. 340,775
Claims priority, application France, July 11, 1963, 941,127
4 Claims. (Cl. 23—334)

The invention relates to a process for ion exchange in a basic medium which can be employed in particular for the purpose of recovering the uranium contained in the low-strength carbonate solutions which are obtained, for example, by leaching of ores.

It is already known that the uranium which is contained in its ores can be solubilized by leaching by means of an aqueous solution of carbonate and/or bicarbonate of alkali metal by means, for example, of the process described in French Patent No. 1,238,330. This process results in raw solutions having a very low uranium content which it is necessary to concentrate. In fact the conventional methods of uranium extraction are only applicable economically to solutions having a concentration which reaches at least 2.5 grams per liter. The processing of raw solutions from direct leaching would represent an excessive consumption of reagent and would provide only a low recovery yield.

The concentration is usually carried out by means of ion exchangers on which is fixed the uranium which is present in the raw solution as an anionic complex in the form of uranyl-tricarbonate $[UO_2(CO_3)_3]^{-4}$, and which is then eluted. The concentrated liquor which is constituted by the eluate permits the possibility of making the cost of chemical extraction reagent proportional, not to the volume of the solutions to be processed, but substantially to the quantity of uranium which they contain. The recovery yield is considerably improved and usually reaches 98 to 99.5%.

There is usually employed as exchanger a strongly basic anionic resin such as Dowex I, Zerolit FF, Lewatet MN or better still IRA–400. The eluting agent in the case of leaching with a carbonate and/or a bicarbonate of an alkali metal was hitherto constituted as a rule by an aqueous solution of chloride or of nitrate of said alkali metal.

Unfortunately, the presence of the chloride or nitrate anion reduces to an appreciable extent the uranium adsorption capacity of the exchange resin. There has thus been observed a reduction of 60% in the uranium adsorption capacity of an exchange resin (Amberlite IRA–400) when the 5% sodium carbonate leach solution contains 2 grams of $Cl^-$ ions per liter of solution. With the $NO_3^-$ ion, the capacity falls in even more substantial proportions: in the case of a solution containing 3% sodium carbonate and 1.05 gram per liter of $NO_3^-$, the capacity of the resin is reduced by 70%.

Unless special precautions were taken, it would therefore not be possible to recycle leach solutions which have become impoverished in uranium by passing them through the exchange resin. In order to be able to carry out such a recycling process, which is of considerable economic importance, it had hitherto proved necessary either to effect the regeneration of the exchange resins between the stages of elution and fixation, or to discharge from the outlet of the exchange column the first fractions of leach solution which contain the objectionable anions.

The object of the present invention is a process for ion exchange in a basic medium which avoids the need either for the aforesaid regeneration or discharge and which, in addition, as a result of a judicious choice of the constituents of the eluting solution, permits the possibility of directly producing the precipitation of high-purity ammonium uranyl-tricarbonate, which in turn permits the recycling of the eluting solution.

To this end, the present invention proposes a process for the extraction of uranium from a dilute solution which contains uranium as an anionic complex $UO_2(CO_3)_3$, consisting in the fixation of uranium on a strongly basic exchange resin and in the elution of the uranium, characterized in that the elution is accomplished by means of an aqueous solution of carbonate and/or of bicarbonate of alkali metal and/or ammonium.

It can be seen that the process in accordance with the invention makes it possible to retain the same anion throughout the leaching operation; in addition, when the solution contains ammonium ions, there takes place a crystallization of ammonium uranyl-tricarbonate which can readily be separated from the eluting solution. This crystallization makes it possible to eliminate the conventional stage of precipitation, for example with sodium hydroxide NaOH, and supplies crystals which are readily transformed into oxide ($UO_3$ or $U_3O_8$) by heating between 250° C. and 500° C.

A. It would be conceivable to accomplish the elution of the exchanger by means of an aqueous solution which contains only a single salt, that is to say which contains either sodium bicarbonate, ammonium carbonate or ammonium bicarbonate.

A number of possibilities are to be contemplated:

(a) If there is employed an aqueous solution of sodium bicarbonate $NaHCO_3$ in order to effect the elution of the exchanger, there does not take place any crystallization in the eluate inasmuch as the sodium uranyl-tricarbonate complex is soluble; it is therefore necessary to have recourse in this case to the precipitation of uranium by a conventional method, which makes the recycling of the solution impracticable.

(b) If there is employed as an elutriant an aqueous solution of ammonium carbonate $(NH_4)_2CO_3$ or of ammonium bicarbonate $NH_4HCO_3$ (the bicarbonate in any case nearly aways contains a certain quantity of carbonate), the crystallization of ammonium uranyl-tricarbonate then takes place and the crystals can be separated and transformed into oxide. It would also be possible to contemplate the possibility of separating out the ammonium uranyl-tricarbonate complex $(NH_4)_4UO_2(CO_3)_3$, then treating the eluting solution which still remains saturated with uranium by making use of one of the two following methods:

(1) Precipitation of the uranium which remains in the solution. However, this conventional method does not permit of recycling and is of no practical interest;

(2) Further separation of ammonium uranyltricarbonate by a physical process. This particular method is distinguished by the fact that it does permit of recycling, is of undeniable advantage from an economic standpoint and is therefore generally preferable. According to this second method, the operation is as follows: after separation of the first fraction of the ammonium uranyl-tricarbonate complex, the eluting solution is usually at a temperature in the vicinity of room temperature, the solubility of the complex at that temperature being by no means negligible. In order to initiate the precipitation of the complex, it is merely necessary to cool the saturated solution; a cooling in the vicinity of 0° C. (between 0 and 10° C.) is sufficient and after separation of the second fraction of the complex, the eluting solution can be used again.

The above fact is important since it permits the recycling of solutions. However, the two methods (a) and (b) noted above have the disadvantage of producing the precipitation in the resin itself or in the bed of exchanger which remains saturated.

B. The present invention proposes the use as eluting solution a mixture of ammonium carbonate and sodium bicarbonate. Two cases are to be contemplated inasmuch as the behaviour of the eluting solution is different according as the ammonium carbonate content is either lower or higher than the sodium bicarbonate content.

(a) In the case in which the sodium bicarbonate content is higher than that of the ammonium carbonate and/or bicarbonate, the crystallization of the ammonium uranyl-tricarbonate in the eluate does not occur. This is due to the formation of a triple complex of ammonium uranyl-tricarbonate and soluble sodium. It is therefore again necessary to envisage the precipitation of uranium from the eluting solution by means of a conventional method which, in the case of a chemical process, prevents the recycling of said eluting solution; this method is therefore of less value than that which follows below.

(b) In the case in which the sodium bicarbonate content is lower, even very slightly lower, than the ammonium carbonate content, precipitation of the ammonium uranyl-tricarbonate accordingly takes place. The sodium bicarbonate content of the eluting solution is of considerable importance inasmuch as it determines the time taken by the ammonium uranyl-tricarbonate to precipitate. It has in fact been seen that a uranium-saturated solution of ammonium carbonate or bicarbonate leaves in the exchanger bed a precipitate of ammonium uranyl-tricarbonate. The introduction of sodium ions in the eluting solution has the effect of retarding this precipitation, that is to say of producing the precipitation only after having passed out of the exchange column. The said precipitation can be completed by cooling as in the case of the method which has been set forth hereinabove. This retarded precipitation, without addition of reagent, is of substantial advantage inasmuch as it permits the possibility, in addition to keeping the exchanger in the form $(CO_3)^{-2}$, of recycling the eluting solutions after adjustment of their concentration in carbonates.

The practical application of Method B (b) is effected with the following contents:

|  | M |
|---|---|
| Ammonium carbonate | 1.1 to 1.4 |
| Alkaline bicarbonate (usually sodium bicarbonate) | 0.3 to 0.9 |

The proportion of $(NH_4)_2CO_3$ is preferably of the order of 1.4 M whereas the proportion of $NaHCO_3$ must depend on the result which is sought, so that if a rapid solution is desired, said proportion is advantageously of maximum value, namely approximately 0.9 M, with cooling if necessary from between 35 and 40° C. (temperature within the exchanger) to between 0 and 10° C. so as to initiate crystallization. The high proportion of $NaHCO_3$ in fact increases the solubility to a maximum extent by formation of a triple complex of uranyl tricarbonate, ammonium uranyl tricarbonate and sodium uranyl tricarbonate.

There now follows below a description of various examples, given by way of non-limitative example, of tests which constitute practical applications of the process for the elution of uranium.

The various tests which have been mentioned hereinabove have been performed in columns packed with 0.1 liter of Amberlite IRA–400. This resin has been saturated with a uranium-bearing solution derived from alkaline leaching by capillarity of schists of Teuflelsloch, said solution having the following characteristics:

| | |
|---|---|
| Uranium, gram per liter | 0.1 |
| Sodium carbonate, grams per liter | 7 |
| pH value | 10.6 |

After saturation, the columns were washed with deionized water (5 volumes of column) prior to being eluted.

The uranium content as expressed in grams of the different fractions of the eluate appears in the following table:

| Volume of eluate in cm.³ | Example 1<br>1.2 M $NH_4HCO_3$ | Example 2<br>1 M $NaHCO_3$ | Example 3<br>0.3 M $(NH_4)HCO_3$, 1.1 M $(NH_4)_2CO_3$ | Example 4<br>0.3 M $NaHCO_3$, 1.4 M $(NH_4)_2CO_3$ | Example 5<br>0.3 M $NaHCO_3$, 1.4 M $(NH_4)_2CO_3$ +U3.6 g./l. |
|---|---|---|---|---|---|
| 50 | 0.0 | 0.00 | 0.00 | 0.04 | 0.00 |
| 100 | 4.02 | 6.60 | 9.03 | 13.00 | 36.50 |
| 150 | 20.31 | 13.20 | 21.60 | 38.10 | |
| 200 | 21.30 | 16.40 | 17.91 | 21.02 | 20.95 |
| 250 | 14.13 | 13.95 | 11.90 | 6.75 | |
| 300 | 8.52 | 9.50 | 7.31 | 2.15 | 10.50 |
| 350 | 6.20 | 6.10 | 4.80 | 0.85 | |
| 400 | 5.35 | 4.90 | 3.22 | 0.46 | 7.20 |
| 450 | 4.51 | 3.90 | 2.73 | 0.30 | |
| 500 | 4.60 | 3.10 | 1.81 | 0.09 | 5.90 |
| 550 | 2.27 | 2.35 | 1.10 | 0.03 | |
| 600 | 2.25 | 2.00 | 0.75 | 0.01 | 4.02 |
| 650 | 1.25 | 1.85 | 0.38 | 0.00 | |
| 700 | 0.69 | 1.65 | 0.19 | | 3.85 |
| 750 | 0.38 | 1.55 | 0.13 | | |
| 800 | 0.24 | 1.45 | 0.05 | | 3.70 |
| 850 | 0.15 | 1.20 | 0.03 | | |
| 900 | 0.09 | 0.95 | 0.01 | | 3.60 |

It should be noted that Example 1 has been given only by way of comparison inasmuch as the elution with $NH_4HCO_3$ is very slow and with bicarbonate is always admixed with a certain quantity of carbonate.

The increase in temperature of the eluting solution only produces a very slight improvment in the elution rate.

In Examples 1, 3, 4 and 5, there is obtained after elution a crystallization of ammonium uranyl tricarbonate of high purity; and simply by heating this compound, there is obtained sinterable reduced uranium oxide (the atmosphere being made reducing by self-cracked ammonia which is derived from the decomposition).

By way of example, an analysis which is carried out on these precipitates has given after transformation into $UO_2$ by heating at 250° C.:

| | P.p.m. |
|---|---|
| Ca | 100 |
| Al, Mg, Cr | 10 |
| Si, B | 5 |
| Mn, Cu | 2 |
| Li | <1 |

We claim:
1. In a process for recovering uranium from a dilute carbonate solution containing uranium as the anionic uranyl carbonate complex $[UO_2(CO_3)_3]$, the steps com- prising: absorbing the uranium from said solution with a strongly basic exchange resin, eluting the uranium from said resin with an aqueous eluting solution comprising ammonium carbonate and a bicarbonate of an alkali metal, the molar proportion of ammonium carbonate $(NH_4)_2CO_3$ being higher than of the alkali metal bicarbonate, precipitating the uranium as $$(NH_4)_3[UO_2(CO_3)_3]$$

separating said precipitate, adjusting the composition of said eluting solution and recycling it.

2. In a process for recovering uranium from a dilute carbonate solution containing uranium as the anionic uranyl carbonate complex $UO_2(CO_3)_3$ the steps comprising: absorbing the uranium from said solution with a strongly basic exchange resin, eluting the uranium from said resin with an aqueous eluting solution comprising between 1.1 M and 1.4 M $(NH_4)_2CO_3$ plus between 0.3 M and 0.9 M bicarbonate of an alkali metal, separating the formed precipitate of $$(NH_4)_3[UO_2(CO_3)_3]$$

adjusting the composition of said eluting solution and recycling it.

3. A process according to claim 2, wherein the solution is about 1,4 M $(NH_4)_2CO_3$ plus about 1.4 M alkali metal bicarbonate.

4. A process according to claim 1, comprising the step of cooling said solution for increasing precipitation of the uranium as $(NH_4)_3[UO_2(CO_3)_3]$.

No references cited.

BENJAMIN R. PADGETT, *Acting Primary Examiner.*

S. TRAUB, *Assistant Examiner.*